June 5, 1951 J. H. DU BOIS ET AL 2,555,476
DOUBLE ACTING MOLD PRESS
Filed March 27, 1948 2 Sheets-Sheet 1
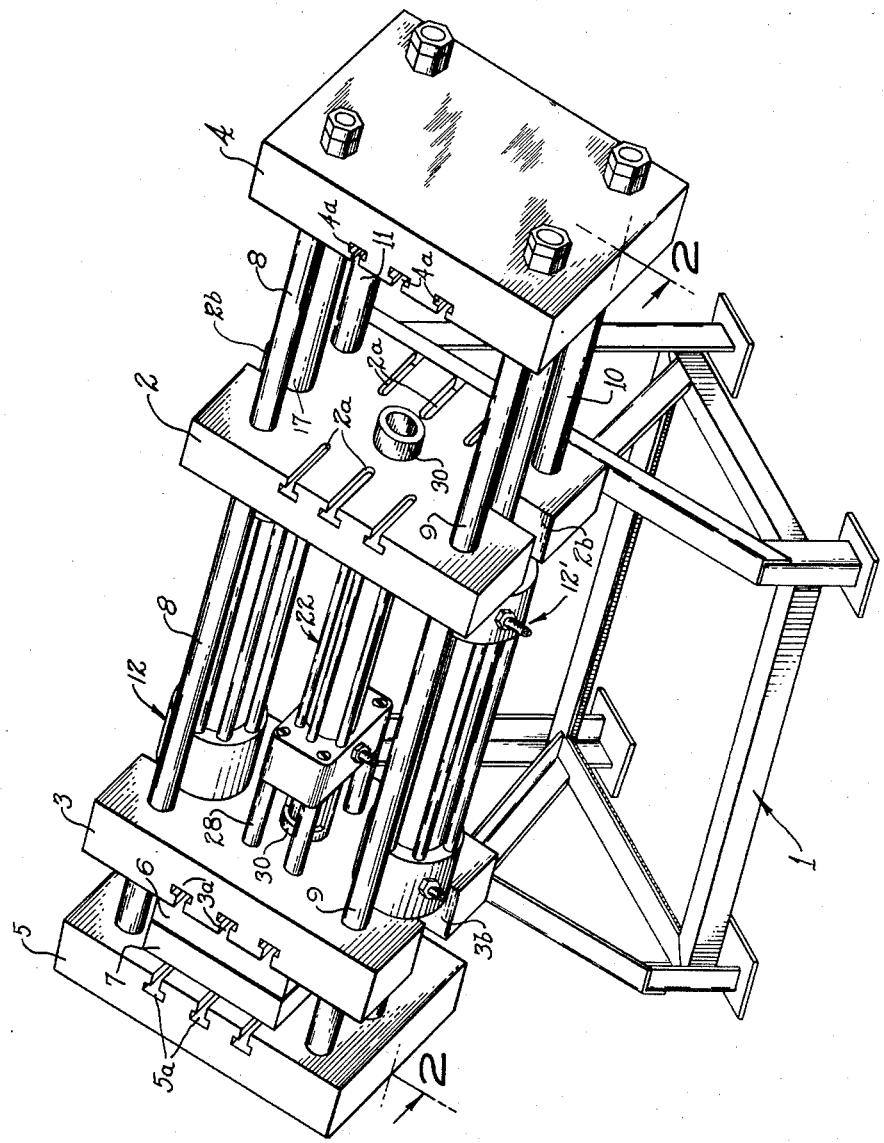
FIG. I
INVENTORS
JOHN H. DuBOIS
FRANK A. CLAESSENS
BY Parham & Bates
ATTORNEYS

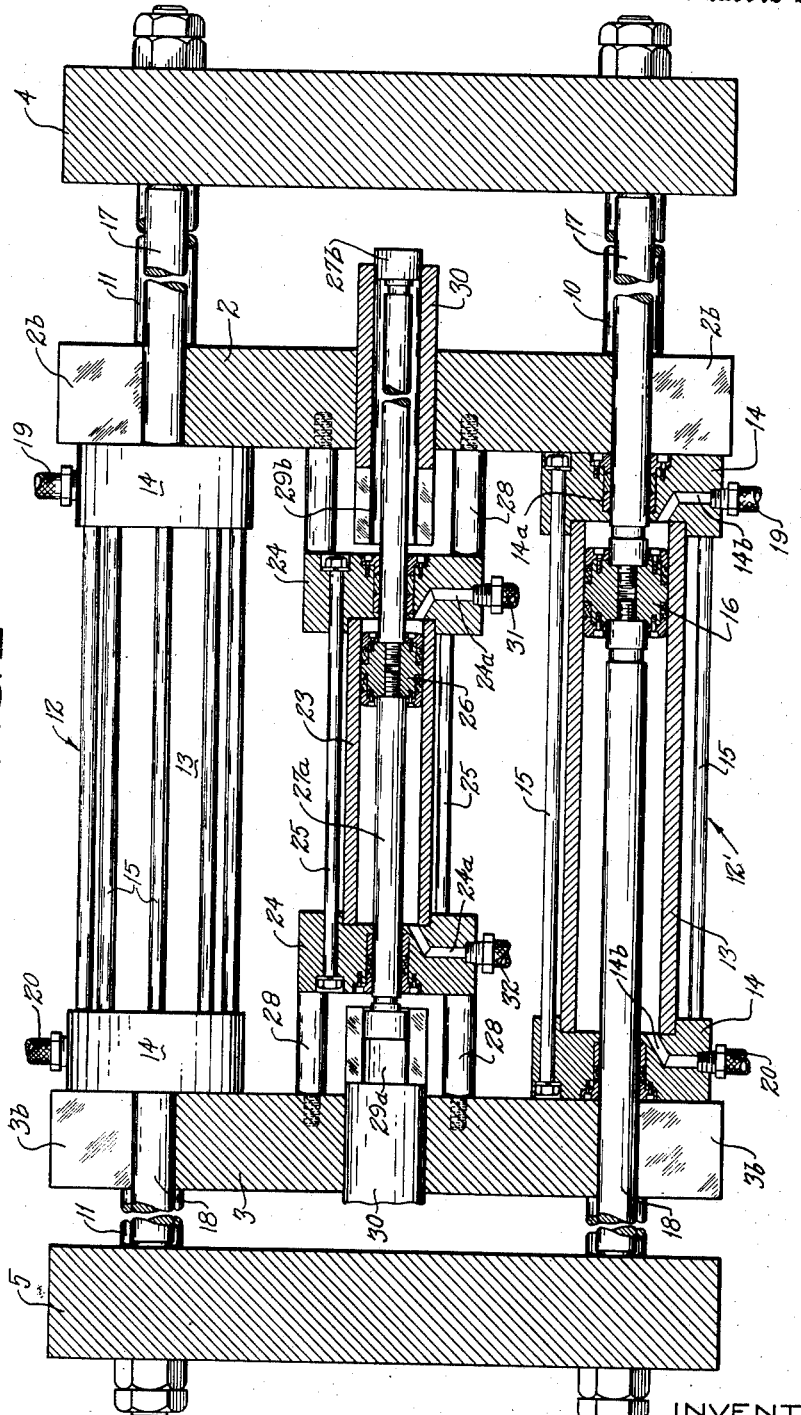

Patented June 5, 1951

2,555,476

UNITED STATES PATENT OFFICE 2,555,476

DOUBLE-ACTING MOLD PRESS

John H. Du Bois, Scotch Plains, N. J., and Frank A. Claessens, West Springfield, Mass., assignors to Shaw Insulator Company, Irvington, N. J., a corporation of New Jersey Application March 27, 1948, Serial No. 17,484

9 Claims. (Cl. 18—30)

The present invention relates to presses, and more particularly to double acting mold presses, of the kind used for forming molded articles from thermosetting and thermoplastic materials.

Such articles are formed with molding apparatus in which cooperating mold members, respectively, are carried by a fixed platen and a movable platen of a power operated press. The mold members may be provided with heating means to facilitate the curing of thermosetting material, or with cooling means for setting thermoplastic articles molded therein.

An object of the invention is to provide a double acting mold press in which the pressure producing mechanism and the moving and stationary platens are located so that the improved press has the several advantages of: compactness and space economy; accessibility of the platens for the ready mounting and dismounting of their respective mold cavity members and the ready accessibility of the cavities when so mounted; and the further advantages of being adaptable to the use of side cores and to the use of automatically operable core assemblies and ejector mechanisms such as, for example, that disclosed in the copending application, Serial No. 726,675, filed February 5, 1947, now Patent No. 2,511,079 by Wayne F. Robb and assigned to the assignee of the present invention.

A further object is to provide the above enumerated advantages in a transfer or injection molding press.

Another object is to provide a dual or double acting press in which both moving press platens are operated by the same force mechanism.

In accordance with the present invention, the force may be provided by stationary hydraulic cylinders, which are located between spaced stationary platens, and may include connections to movable platens, which are located outboard of the stationary platens, the connections being such that clamping pressure exerts no axial tensile stress on the clamping cylinders and effects well distributed reaction pressure on the stationary platens.

The force for effecting transfer or injection of the molding material may be effected by a hydraulic cylinder and transfer ram, the cylinder preferably being located intermediate, and secured to, the stationary platens. The ram may be double ended so that each end may effect transfer of material into a mold. The mounting of the transfer ram cylinder in this manner provides for distribution of the reaction pressure of the cylinder through both the stationary platens and such cylinder tie rods as may be employed, and thus avoids concentrated loading and permits more economical construction for a given platen deflection.

Presses incorporating the present invention minimize unbalanced loading. Less wear and more accurate mold alignment is effected and maintained. The balanced pressures in stress rods, and other press parts, require a minimum of reinforcing members and permit weight reduction and lower construction costs in presses of this type.

With these objects and advantages, and others of a similar nature, in view, the invention consists in the construction, combination and arrangement of parts set forth in, and falling within the scope of, the appended claims.

In the accompanying drawings,

Fig. 1 is a perspective view of one embodiment of a press embodying the present invention and shows the left hand stationary and movable platens and mold cavity members in their closed position ready to receive a mold charge from a transfer chamber and ram; and Fig. 2 is a cross-sectional view taken generally on line 2—2 of Fig. 1 without the press frame and the mold cavity members.

The illustrated double acting press embodying the invention includes a supporting base or frame, generally designated 1, to which fixed or stationary platens 2 and 3 are rigidly secured in spaced vertical planes. Movable platens 4 and 5 are located outboard of platens 2 and 3 respectively.

As shown in Fig. 1, the platens 2, 3, 4 and 5 are of like rectangular shape and are of sufficient size and weight to support and to sustain mold cavity members 6 and 7 and the press load exerted thereon by the press.

More particularly, the platens 4 and 5 are rigidly secured at their four corners to the opposite ends of four parallel tie rods 8, 9, 10 and 11. As shown in Fig. 1, the tie rods extend through and serve as guide rods which are reciprocally supported in suitable passageways in the stationary platens 2 and 3. Preferably, each adjacent pair of parallel rods 8, 9, 10 and 11 are located in planes which define 45° angles with the horizontal. It has been found that this angular disposition of the tie and guide rods makes for more ready accessibility to the space for the mold cavity members 6 and 7 between the two pairs of stationary and movable platens 2, 4 and 3, 5 when the respective pairs are open.

While, for purposes of illustration, only platens 3 and 5 are shown provided with cooperative mold members 6 and 7, it will be understood that, when in operation, the platens 2 and 4 are provided with like mold members which are attachable thereto in conventional manner, as by means of the T slots or tracks $2a$, $3a$, $4a$, and $5a$ and suitable bolts or other fasteners (not shown).

It will be understood that the shape of the molds 6 and 7 of the forming cavities therein, will vary with the size and shape of the articles to be molded. Similarly, the mold members may include means, as for example, heating or cooling means, for curing or setting the material introduced into, and shaped in, the molds. These mold practices are well known to the art and, inasmuch as they are not determinative of the present invention, are not illustrated in the drawings or further described herein. For the same reason, side cores, ejector and core mechanisms, and other auxiliary molding equipment of either a manual or automatic nature, are not shown. However, it is to be understood that presses involving the present invention are adaptable to the use of those mold mechanisms and equipment and that they readily may be incorporated in, or mounted on, the mold or platen members.

In the embodiment of the invention shown in the drawings, the force for effecting the pressing pressure on both pairs of press platens is provided by two hydraulic cylinders and piston assemblies, generally designated 12 and 12'. More particularly, each clamping cylinder assembly includes a tubular member or cylinder 13 to the ends of which like cylinder heads 14 are secured as by tie rods 15. Each head 14 is secured to the adjacent stationary platen, 2 or 3, so that the clamping cylinder assemblies brace and provide greater rigidity and strength to the stationary platens 2 and 3.

Located within each cylinder 12 and 12' is a piston 16 to which is secured the adjacent ends of like compression rods 17 and 18, the outer ends of which respectively engage the movable platens 4 and 5. The openings in the cylinder heads 14 through which the compression rods 17 and 18 extend, may be packed in conventional manner as shown at $14a$. Air or other medium for exerting hydraulic pressure on the piston 16 may be introduced into, and discharged from, the ends of the cylinders 13 from lines 19 and 20 through connecting passageways $14b$ in each of the cylinder heads 14. It will be understood that the selective regulation and control of the pressure medium supplied to the clamping cylinders 12 and 12' from an adequate source, may be controlled in conventional manner, as by means of automatically or manually operated valves (not shown).

The clamping cylinder assemblies 12 and 12' are located midway between opposite pairs of the tie and guide rods 9, 10, and 8, 11 for proper distribution of clamping and reaction pressures and for ready access, between upper rods 8 and 9, to the molds. The arrangement also permits discharge of molded articles from the mold members 6 and 7 downwardly between the rods 10 and 11 into a hopper or other receptacle (not shown) without obstruction.

The press thus far described is adapted, without more, for compression molding. However, the invention also contemplates a press for transfer or injection molding and, accordingly, the illustrated embodiment is provided with a transfer or injection cylinder assembly, generally designated 22, which may be similar in construction to the clamping cylinder assemblies 12 and 12'. As shown in the drawings, the assembly 22 includes a tubular member or cylinder 23, cylinder heads 24, tie rods 25, piston 26 and transfer piston rods or rams $27a$ and $27b$. The transfer cylinder assembly 22 is secured at its ends to the stationary platens 2 and 3, and preferably is located midway between the clamping cylinders 12 and 12' and the guide rods 8–11. The connection between the end members or heads 24 and the fixed platens 2 and 3 include spacers 28 which provide for access to chambers $29a$ and $29b$ in which charges of plastic composition may be placed for transfer or injection into the molds 6, 7. More particularly, the chambers $29a$ and $29b$ are the inboard partially cutaway ends of cylindrical transfer tubes 30 which extend centrally through the fixed platens 2 and 3, respectively, and through which the respective transfer rods $27a$ and $27b$ force the charge of moldable material into the mold cavity members.

Air or other medium for exerting hydraulic pressure on the transfer piston 26 to effect the transfer of material from the chambers $29a$ and $29b$ into their adjacent molds may be introduced into, and discharged from, the ends of the cylinder 23 from lines 31 and 32 through connecting passageways $24a$ in the heads 24.

To operate the press, air or other hydraulic medium is introduced under the necessary pressure into the lines 20 to force the clamping cylinder pistons to the position shown in Fig. 2. This movement exhausts the air to the right of the pistons 16 in the cylinders 13 through the lines 19. Concurrently, the rods 17 press against the movable platen 4 and move the platen assembly consisting of the two movable platens 4 and 5 and the tie rods 8, 9, 10 and 11 to the position shown in Fig. 1. In the latter position, the air pressure is sustained and a proper clamping pressure maintained on the mold members 6 and 7 by the platens 3 and 5 through the axially compressive stress exerted by the rods 17 on the platen 4 and through tensile stresses exerted through the four tie rods 8–11. It has been found that the clamping pressure on platen 5 and the reaction pressure on platen 3 is well distributed and the mold members 6 and 7 are properly held for a molding operation.

With the transfer piston 26 in the position shown in Fig. 2, a charge of molding material is placed in the chamber $29a$ and transferred into, and held in, the mold cavities by the ram $27a$ under pressure exerted through the line 31 and the transfer piston 26.

Following partial or full curing or setting of the molded article in the mold, the pressure in line 20 is relieved, and pressure introduced through lines 19 to separate the platens 3 and 5 and, simultaneously, close the platens 2 and 4 for a molding operation in the right hand half of the press. A charge is placed in the receiving chamber $29b$ and the transfer piston 26 and ram $27b$ moved to the position shown in Fig. 2 to effect the charge transfer and the molding operation in the right-hand half of the press.

The inclination of the press at a forty-five degree angle and the arrangement of the press parts as illustrated and described, provides for ready removal of molded articles and accessibility of the mold cavities and transfer chambers for cleaning between molding operations.

It will be seen that the reaction pressure of the transfer ram cylinder is distributed through both stationary platens 2 and 3 and all the cylindrical tie rods 15 and 25 so as to avoid concentrated loading.

The press is particularly adapted to economic utilization of space and construction materials.

In the event of failure of either clamping cylinder assemblies 12 and 12', the faulty cylinder readily may be removed and repaired or replaced without disassembling the press. The openings 2b and 3b in the stationary platens 2 and 3, through which the compression rods 17 and 18 extend, may be slots opening outward so as to facilitate the removal and replacement of the assemblies.

We claim:

1. A double acting press including a pair of spaced stationary mold platens, two movable mold platens, a movable mold platen being operably mounted outboard of each stationary platen, tie rods to the opposite ends of which the movable platens are secured for simultaneous movement, and force means located intermediate said stationary platens for moving the movable platens alternately into and out of pressing relation with the adjacent inboard stationary platen associated with each movable platen.

2. The press recited in claim 1 and including a transfer mechanism located between said stationary platens.

3. The press recited in claim 1 and including compression rods through which the force mechanism effects movement of said movable platens.

4. A double acting press including a frame, a pair of spaced platens secured to said frame, parallel guide and tie rods reciprocally mounted relative to said secured platens, a movable platen located outboard of each secured platen, each movable platen being secured to opposite ends of said tie rods and each of said movable platens being movable into pressing relationship with the adjacent inboard secured platen, force mechanism located between and secured to said secured platens and including a compression rod for forcing one of said movable platens away from the adjacent inboard secured platen and simultaneously moving said connecting rods and drawing the other of said movable platens into pressing relationship with its adjacent inboard, secured platen.

5. A double acting press including a frame, a pair of spaced mold supporting platens secured to said frame and located in parallel vertical planes, parallel guide and tie rods reciprocally mounted relative to said secured platens and located in spaced planes obliquely disposed to the horizontal, a pair of movable platens secured to opposite ends of said rods adjacent each secured platen, each movable platen being movable into pressing relationship with the adjacent secured platen, and force mechanism located between said platens for moving said movable platens into and out of pressing relationship with said fixed platens.

6. The press recited in claim 5 wherein the force mechanism includes a compression rod for moving a movable platen away from its adjacent secured platen, and, through the tie rods, drawing the other movable platen into pressing relationship with the other of secured platens.

7. The press recited in claim 5 and including transfer molding mechanism.

8. A double acting press including a frame, a pair of spaced mold supporting platens secured to said frame and located in parallel vertical planes, a pair of movable platens, a movable platen being operably mounted outboard of each secured platen and each movable platen being movable into pressing relationship with the adjacent inboard secured platen, tie rods to the opposite ends of which the movable platens are secured for simultaneous movement, force mechanism for moving said movable platens alternately into and out of pressing relationship with said fixed platens, and a transfer molding force located between and secured to said secured platens for transferring molding charges from inboard each secured platen through said platen into a molding space between a secured and a movable platen.

9. The press recited in claim 8 and including transfer chambers located between the transfer force and each of said secured platens, and wherein said transfer force includes a double-ended transfer ram for forcing molding charges from said chambers through passageways in each of the secured platens into the molding space between the adjacent secured and movable platens.

JOHN H. DU BOIS.
FRANK A. CLAESSENS.

REFERENCES CITED

The following references are of record in the file of this patent:

UNITED STATES PATENTS

| Number | Name | Date |
|---|---|---|
| 1,936,141 | Pack | Nov. 21, 1933 |
| 2,223,385 | Plessman | Dec. 3, 1940 |
| 2,261,592 | Smith | Nov. 4, 1941 |

FOREIGN PATENTS

| Number | Country | Date |
|---|---|---|
| 373,122 | Great Britain | May 17, 1932 |

OTHER REFERENCES

British Plastic, April 1939, page 631, "Injection Molding," by Alfonso Amigo.